E. PRATT.
BALL BEARING BLOCK.
APPLICATION FILED JULY 28, 1915.
1,266,855.
Patented May 21, 1918.
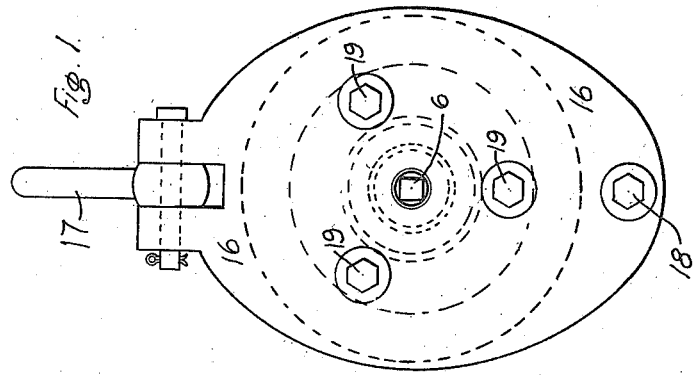
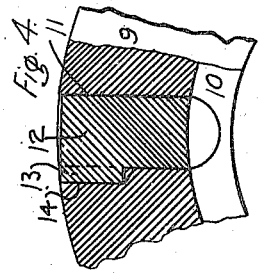
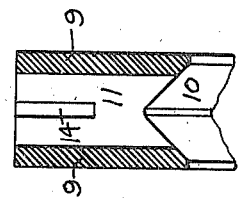
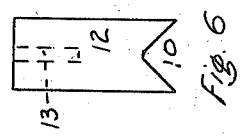
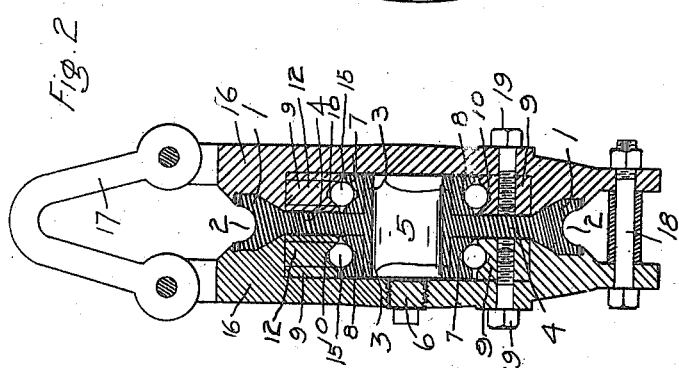
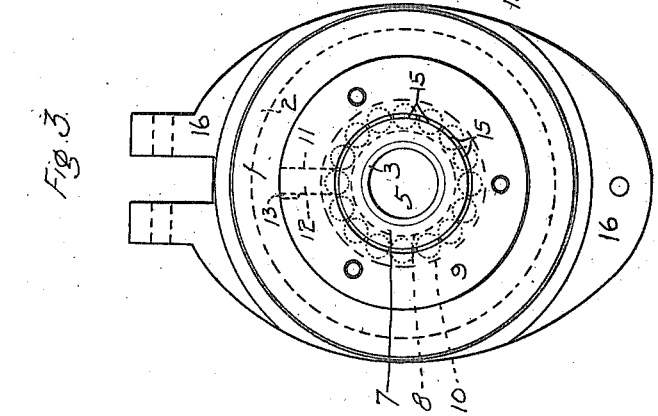
Inventor
Edward Pratt
By G. P. Elliott
Attorney

UNITED STATES PATENT OFFICE.

EDWARD PRATT, OF CHEHALIS, WASHINGTON, ASSIGNOR OF ONE-THIRD TO CHARLES LENTZ AND ONE-THIRD TO O. J. ALBERS, BOTH OF CHEHALIS, WASHINGTON.

BALL-BEARING BLOCK.

1,266,855. Specification of Letters Patent. Patented May 21, 1918.

Application filed July 28, 1915. Serial No. 42,283.

*To all whom it may concern:*

Be it known that I, EDWARD PRATT, a citizen of the United States, residing at Chehalis, in the county of Lewis, State of Washington, have invented certain new and useful Improvements in Ball-Bearing Blocks, of which the following is a specification.

This invention relates to pulley blocks and especially to such blocks as are adapted for use under heavy strains and rough usage such as is experienced in logging operations. The objects of my invention are to eliminate the central pin on which the sheave is usually mounted and which wears out very quickly and is expensive to replace and to substitute therefor a ball bearing; to provide a central chamber for oiling the sheave; and to protect the moving parts of the bearing from dust and dirt. My invention further consists in certain novel features in the construction of the ball bearing whereby the sheave and the ball bearing parts are all held together by means of the balls themselves and cannot be taken apart without the removal of all the balls therefrom.

I attain these and other objects by the devices, mechanisms and arrangements illustrated in the accompanying drawing, in which—

Figure 1 is a side elevation of my improved ball bearing block; Fig. 2 is a cross-section thereof; Fig. 3 is a side elevation thereof when one supporting plate has been removed; Fig. 4 is a section of the ball ring showing the passage therein for the insertion and removal of the balls, and the plug therein; Fig. 5 is a cross-section thereof with the plug removed; Fig. 6 is an elevation of the plug; and Fig. 7 is a plan of the ring showing the said passage with the plug therein.

Similar numerals of reference refer to similar parts throughout the several views.

One of the greatest weaknesses of the ordinary pulley block now in use in the logging industries is found in the pin by which it, the sheave, is supported and on which it turns. This pin must be large enough to withstand the hard usage incident to the handling of heavy logs and the friction developed between the sheave and the pin quickly wears the parts so as to constantly require renewals and repairs. In the hereinafter described block I have entirely eliminated the said pin and have arranged the sheave so that, so far as its bearing surface is concerned, it turns within the bearing instead of outside of it as in the pin, thus enabling a bearing of larger relative diameter to be used and thus increasing the number of balls in the ball race.

Referring now to the drawings, it will be seen that the rim 1 of the sheave is provided with the usual rope groove 2 and that the sheave is provided with an integral hub 3 extending laterally on each side along its central axis. For the purpose of making the completed block as compact as possible I make the web 4, joining the hub 3 to the outer grooved rim 1 as thin as will stand the strains satisfactorily and thus I am able to bring the sets of ball bearings on each side of the sheave fairly close together and almost under the rope groove 2, yet separated far enough apart to take care of the side strains thereon. The center of the hub 3 is preferably made hollow, as shown at 5, thus lightening the sheave and providing an oil receptacle. Access is had to this oil receptacle through a hole in one or both of the side plates, said hole being suitably closed by a screw plug 6. On each hub 3 I secure, preferably by shrinking thereon, a cylindrical ring 7, each of which is provided with a suitable ball groove 8 in its outer cylindrical surface.

A pair of complementary cylindrical rings 9 are positioned immediately outside of and surrounding the said rings 7, and each is also provided with a similar ball groove 10 in their inner cylindrical surface, the said grooves 10 and 8 of a pair lying in corresponding planes and together forming a ball race, so that one such ball race is positioned on each side of the web 4 of the sheave. It will be observed that since the adjacent surfaces of the two corresponding rings are cylindrical and parallel and the ball race is cut therein, therefore it is necessary to provide some means of putting the balls in the race after the parts have been put into their proper positions, for otherwise, it would be impossible to assemble the parts of the bearing. I have therefore provided a passage 11 in each outer ring 9, extending inward from its outer surface to the ball race and of sufficient size to permit the balls to freely pass therethrough. The passage 11 is closed by means of a removable plug 12 which fits therein, the end of said plug being formed (Fig. 6) in accordance with the groove 10 so that there is no break in the surface of the groove. A feather 13 is attached to the plug 12 and fits in a corresponding keyway 14 in the ring 9 adjacent the passage 11 so that when the plug is inserted in place the feather and keyway will prevent its turning in the passage and thus blocking or obstructing the ball race. However, I secure the rings 9 in such positions in the block that the passages 11 and plugs 12 are on the unstrained side of the bearing hence the balls do not press against the end of the plug as they move therepast in the ball race. Balls 15 are inserted through the passages 11 into their respective ball races and then the plugs 12 are inserted. It will now be seen that neither ring 9 can be removed from the sheave because the balls 15 lock it thereto although they leave it free to rotate relatively thereto.

The side plates 16 are of the usual form except that they have no central hole for the axle or pin on which the sheave usually turns. They are, of course, made complementary to each other and are secured together above by means of a suitable clevis 17 and below by a bolt and separator 18. The plates 16 overhang the edges of the sheave rim 1, as shown, to guide the rope into the groove 2 and prevent the entrance of grit and other foreign matter between the sheave and the plates. They are formed with depressions in their inner face wherein the rings 9 fit. The said rings 9 are secured to their respective adjacent side plates 16 by means of screws 19. The side plates 16 are therefore secured together not only by the clevis 17 and bolt 18 but also by the balls 15 of the bearings as already described. Since the side plates have no opening they effectively protect the bearings from dirt and grit, especially as the oil works outward from the center and thus prevents the entrance of foreign matter around the rim of the sheave.

Having described my invention, what I claim is:

1. In a ball bearing block in combination, a clevis, a pair of side plates pivotally connected to said clevis, said side plates having inwardly opening cylindrical recesses therein, rings seated within said recesses, said rings having internal grooves therein, a sheave mounted between said blocks and having a hub projecting within said rings, said hub having a pair of external grooves complemental to said internal grooves in said rings, and balls within said grooves forming a bearing for said sheave within said rings.

2. In a ball bearing block in combination, a clevis, a pair of side plates connected to said clevis, said side plates having internally opening cylindrical recesses, rings seated in said recesses, said rings having internal grooves therein, a sheave mounted between said rings, said sheave having a hub provided with external grooves complemental to the internal grooves in said rings, and balls in said grooves forming the bearings of said sheave.

3. In a ball bearing block in combination, a clevis, a pair of side plates connected to said clevis, said side plates having inwardly opening recesses, rings seated in said recesses, said rings having internal grooves therein and having apertures extending from the exterior surfaces of the rings to said grooves, a sheave mounted between said rings, said sheave having a hub provided with external grooves complemental to the grooves in said rings, balls in said grooves forming a bearing for said sheave and means for closing said aperture after the balls have been introduced into the grooves.

4. In a ball bearing block in combination, a clevis, a pair of side plates connected to said clevis, rings mounted within said side block, said rings having internal grooves therein, a sheave mounted between said rings provided with a hub having external grooves therein complemental to said grooves in said rings, and balls in said grooves forming a bearing for said sheave.

EDWARD PRATT.

Copies of this patent may be obtained for five cents each, by addressing the "Commissioner of Patents, Washington, D. C."